(12) United States Patent
Geller

(10) Patent No.: US 10,576,839 B2
(45) Date of Patent: Mar. 3, 2020

(54) MOTOR LOCK OVERHEAT MITIGATION CONTROL FOR AUTONOMOUS VEHICLES

(71) Applicant: Toyota Motor Engineering & Manufacturing North America, Inc., Plano, TX (US)

(72) Inventor: Benjamin M. Geller, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 42 days.

(21) Appl. No.: 16/052,529

(22) Filed: Aug. 1, 2018

(65) Prior Publication Data

US 2020/0039361 A1    Feb. 6, 2020

(51) Int. Cl.
```
G06F 17/00      (2019.01)
B60L 15/20      (2006.01)
H02P 29/032     (2016.01)
```
(52) U.S. Cl.
CPC ............ B60L 15/20 (2013.01); H02P 29/032 (2016.02); *B60L 2240/421* (2013.01); *B60L 2240/423* (2013.01); *B60L 2260/42* (2013.01); *B60L 2260/50* (2013.01)

(58) Field of Classification Search
CPC ........ B60K 6/445; B60K 6/365; B60K 6/387; B60K 1/02; B60L 3/003; B60T 8/17555; B60G 17/019; A61H 33/005; G01S 19/19; B62J 2099/0013; B60W 2510/244; G06F 17/00

See application file for complete search history.

(56) References Cited

U.S. PATENT DOCUMENTS

| | | | |
|---|---|---|---|
| 4,090,114 | A | 5/1978 | Thompson |
| 6,339,301 | B1 | 1/2002 | Wallingford |

(Continued)

FOREIGN PATENT DOCUMENTS

JP    H07177609 A    7/1995

OTHER PUBLICATIONS

Zulkifi et al. Operation, power flow, system architecture and control challenges of split-parallel through-the-road hybrid electric vehicle, 2015, IEEE, p. 1-6 (Year: 2015).*

(Continued)

*Primary Examiner* — McDieunel Marc
(74) *Attorney, Agent, or Firm* — Snell & Wilmer LLP

(57) ABSTRACT

A system for reducing motor drive loss in a vehicle. The system includes a motor designed to convert electrical energy into torque. The system also includes a sensor designed to detect motor data corresponding to at least one of a motor torque or a motor speed of the motor. The system also includes a memory designed to store testing data including optimized current commands for multiple combinations of motor torques that were determined during testing of the motor or a similar motor. The system also includes a speed or torque controller coupled to the motor, the sensor, and the memory and designed to receive a speed or torque command and to determine a current command signal usable to control the motor based on the speed or torque command, the testing data, the detected motor data, and an artificial intelligence algorithm.

20 Claims, 5 Drawing Sheets

(56) References Cited

U.S. PATENT DOCUMENTS

| | | | | |
|---|---|---|---|---|
| 8,055,415 | B2* | 11/2011 | Belmont | B60K 6/387 |
| | | | | 180/247 |
| 8,060,268 | B2 | 11/2011 | Hasegawa et al. | |
| 8,249,768 | B2* | 8/2012 | Mori | B60K 6/445 |
| | | | | 701/22 |
| 8,311,691 | B2* | 11/2012 | Matsumoto | B60L 3/003 |
| | | | | 701/22 |
| 8,321,082 | B2* | 11/2012 | Ando | B60K 6/365 |
| | | | | 208/1 |
| 8,340,850 | B2* | 12/2012 | Muta | B60K 6/445 |
| | | | | 701/22 |
| 8,577,531 | B2* | 11/2013 | Semsey | B60T 8/17555 |
| | | | | 188/71.5 |
| 8,630,795 | B2* | 1/2014 | Breed | G01C 21/3697 |
| | | | | 123/352 |
| 9,045,132 | B1 | 6/2015 | Zhao et al. | |
| 9,225,280 | B2 | 12/2015 | Okamura et al. | |
| 9,494,093 | B2 | 11/2016 | Crombez et al. | |
| 9,528,247 | B1 | 12/2016 | Kamado | |
| 9,559,626 | B2 | 1/2017 | Lee | |
| 9,702,349 | B2* | 7/2017 | Anderson | B60G 17/019 |
| 9,764,645 | B2 | 9/2017 | Kaji et al. | |
| 9,764,720 | B2 | 9/2017 | Erban et al. | |
| 9,806,661 | B2 | 10/2017 | Najima | |
| 9,906,172 | B2 | 2/2018 | Ross | |
| 9,925,973 | B2 | 3/2018 | Cho et al. | |
| 9,963,199 | B2* | 5/2018 | Hancock | G01S 19/19 |
| 10,219,975 | B2* | 3/2019 | Potucek | A61H 33/005 |
| 2004/0012205 | A1 | 1/2004 | Sua-An | |

OTHER PUBLICATIONS

Montazeri-Gh et al., Application of Vehicle Telematic System in Fuzzy-Based HEV Control, 2008, IEEE, 1-7 (Year: 2008).*

Malikopoulos et al., Supervisory Power Management Control Algorithms for Hybrid Electric Vehicles: A Survey, 2014, IEEE, p. 1869-1885 (Year: 2014).*

Corregedor et al., Design and implementation of an autonomous hybrid vehicle, 2011, IEEE, p. 1-6 (Year: 2011).*

* cited by examiner

MOTOR LOCK OVERHEAT MITIGATION CONTROL FOR AUTONOMOUS VEHICLES

BACKGROUND

1. Field

The present disclosure relates to systems and methods for controlling a motor-generator of a vehicle to reduce overheating of the motor-generator.

2. Description of the Related Art

Electric and hybrid vehicles include motors or motor-generators that convert electricity into mechanical power for propelling the vehicle. Many such motor-generators have multiple phases. Alternating current is driven through each phase of the motor-generator, thus driving rotation of the motor-generator. When the motor-generator fails to rotate, current may continuously flow through one of the phases of the motor-generator. This may be especially true if power is requested of the motor-generator while the motor-generator is failing to rotate. Such a situation may occur if the motor-generator is being used to hold the vehicle at a stop, or if the motor-generator is being instructed to accelerate the vehicle from a stop.

A similar situation may occur in direct current (DC) motors. In a DC motor, a stator provides a constant magnetic field. Coils are located inside of the stator and are designed to receive DC power through commutator rings. When current flows through the coils, an electromagnetic force is applied to the coils, causing them to rotate. When the motor fails to rotate, current can continuously flow through one of the coils.

A condition called motor lock may occur if current continuously flows through one or more phases of the motor-generator (or through one coil of a DC motor) while a relatively heavy load is placed on the motor-generator. The relatively heavy load may be experienced if the motor-generator is holding the vehicle at a stop (or being used to accelerate the vehicle from a stop) while the vehicle is on a road having a relatively large grade (i.e., while the vehicle is traveling up a relatively steep hill). Motor lock results in overheating of the phase of the motor-generator that is receiving the current and may damage the motor-generator or may otherwise be undesirable.

In that regard, systems and methods for reducing the likelihood of motor lock occurring are desirable.

SUMMARY

Described herein is a system for mitigating or eliminating motor lock of a vehicle. An exemplary system includes a motor-generator designed to convert electrical energy into mechanical power to propel the vehicle. The system further includes a location sensor designed to detect location data corresponding to a current location of the vehicle. The system further includes a camera designed to detect image data corresponding to a current road condition of a current road. The system further includes a grade sensor designed to detect grade data corresponding to a current road grade of the current road. The system further includes an electronic control unit (ECU) coupled to the motor-generator, the location sensor, the camera, and the grade sensor. The ECU is designed to determine an upcoming stop condition corresponding to a situation in which a vehicle stop is appropriate based on at least one of the location data or the image data. The ECU is further designed to determine a high load condition corresponding to a potentially high load placed on the motor-generator based on at least one of the location data or the grade data. The ECU is further designed to control the motor-generator to at least one of operate above a predetermined revolutions per minute (RPM) rate or cause the vehicle to move above a predetermined vehicle speed in response to determining the upcoming stop condition and the high load condition to reduce a likelihood of the motor-generator overheating.

Also disclosed is a system for mitigating or eliminating motor lock of a vehicle. The system includes a motor-generator designed to convert electrical energy into mechanical power to propel the vehicle. The system further includes a location sensor designed to detect location data corresponding to a current location of the vehicle. The system further includes a camera designed to detect image data corresponding to a current road condition of a current road. The system further includes a grade sensor designed to detect grade data corresponding to a current road grade of the current road. The system further includes a memory designed to store map data. The system further includes an electronic control unit (ECU) coupled to the motor-generator, the location sensor, the camera, the grade sensor, and the memory. The ECU is designed to maneuver the vehicle based on the map data and at least one of the location data or the image data. The ECU is further designed to determine an upcoming stop condition corresponding to a situation in which a vehicle stop is appropriate based on at least one of the location data or the image data. The ECU is further designed to determine a high load condition corresponding to a potentially high load placed on the motor-generator based on at least one of the location data or the grade data. The ECU is further designed to control the motor-generator to at least one of operate above a predetermined revolutions per minute (RPM) rate or cause the vehicle to move above a predetermined vehicle speed in response to determining the upcoming stop condition and the high load condition to reduce a likelihood of the motor-generator overheating.

Also disclosed is a method for mitigating or eliminating motor lock of a vehicle. The method includes detecting, by a location sensor, location data corresponding to a current location of the vehicle. The method further includes detecting, by a camera, image data corresponding to a current road condition of a current road. The method further includes detecting, by a grade sensor, grade data corresponding to a current road grade of the current road. The method further includes determining, by an electronic control unit (ECU), an upcoming stop condition corresponding to a situation in which a vehicle stop is appropriate based on at least one of the location data or the image data. The method further includes determining, by the ECU, a high load condition corresponding to a potentially high load placed on a motor-generator based on at least one of the location data or the grade data. The method further includes controlling, by the ECU, the motor-generator to at least one of operate above a predetermined revolutions per minute (RPM) rate or to cause the vehicle to move above a predetermined vehicle speed in response to determining the upcoming stop condition and the high load condition to reduce a likelihood of the motor-generator overheating.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

The present disclosure describes systems and methods for reducing or eliminating motor lock of a motor-generator of a vehicle. The systems provide various benefits and advantages such as reducing or eliminating the likelihood of overheating of the motor-generator. The systems may advantageously cause the motor-generator to continue rotating when it would otherwise fail to rotate in order to cause current to flow through multiple phases instead of a single phase of the motor-generator. Such rotation reduces the likelihood of current flow overheating a phase of the motor-generator. These systems may further advantageously increase a flow of coolant through the motor-generator, thus additionally reducing the likelihood of overheating of the motor-generator. These systems may also beneficially be capable of determining whether a route is likely to cause overheating of the motor-generator, and cause the vehicle to travel along an alternative route that is less likely to result in overheating of the motor-generator.

An exemplary system may be included in a vehicle and may include a motor-generator, a plurality of sensors, a memory that stores map data, and an electronic control unit. The vehicle may be an autonomous vehicle, meaning that it may control itself to drive (including accelerating, braking, and steering) from a starting location to a destination. The ECU may be capable of determining a stop condition corresponding to a situation in which it is appropriate for the vehicle to come to a stop. The ECU may be further capable of determining a high load condition indicating that a high load may potentially be placed on the motor-generator. For example, the high load condition may be determined if the vehicle is traveling along a road having a relatively high grade. The ECU may control the motor-generator to operate above a predetermined revolution per minute (RPM) rate as it approaches the stop condition if the high load condition is present in order to reduce the likelihood of motor lock occurring with the motor-generator. By causing the motor-generator to operate above the predetermined RPM rate, the likelihood of the motor-generator overheating is significantly reduced.

Figure 1:
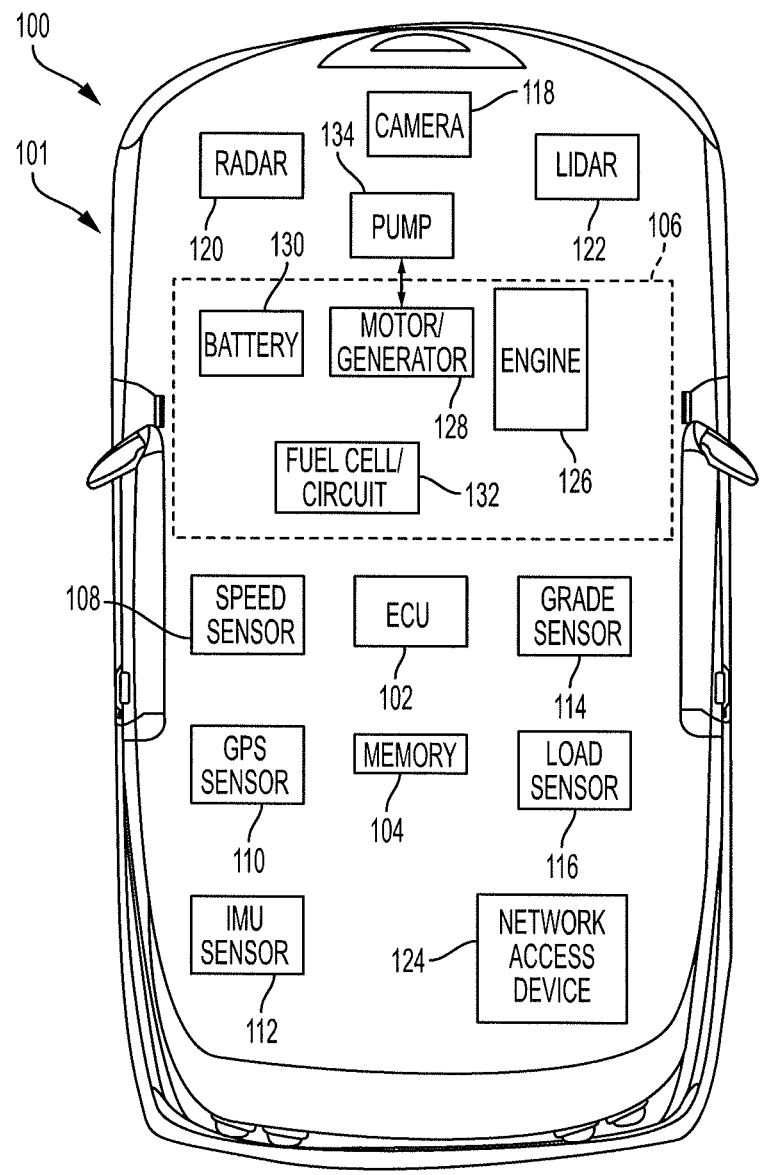
FIG. 1 is a block diagram illustrating a vehicle that includes a system for reducing or eliminating motor lock in a motor-generator of the vehicle according to an embodiment of the present invention.

Turning to FIG. 1, a vehicle 100 includes a system 101 for reducing motor drive loss. The vehicle 100 (or system 101) may include an ECU 102, a memory 104, and a power source 106. The vehicle 100 (or system 101) may further include a plurality of sensors including a speed sensor 108, a global positioning system (GPS) sensor 110, an inertial measurement unit (IMU) sensor 112, a grade sensor 114, a load sensor 116, a camera 118, a radio detection and ranging (radar) sensor 120, and a light imaging, detection, and ranging (LIDAR) sensor 122. The vehicle 100 (or system) may further include a network access device 124.

The power source 106 may include any one or more of an engine 126, a motor-generator 128, a battery 130, or a fuel-cell circuit 132. The engine 126 may convert a fuel into mechanical power for propelling the vehicle 100. In that regard, the engine 126 may be a gasoline engine, a diesel engine, or the like.

The battery 130 may store electrical energy. In some embodiments, the battery 130 may include any one or more energy storage device including a battery, a flywheel, a super capacitor, a thermal storage device, or the like.

The fuel-cell circuit 132 may include a plurality of fuel cells that facilitate a chemical reaction to generate electrical energy. For example, the fuel cells may receive hydrogen and oxygen, facilitate a reaction between the hydrogen and oxygen, and output electricity in response to the reaction. In that regard, the electrical energy generated by the fuel-cell circuit 132 may be stored in the battery 130. In some embodiments, the vehicle 100 may include multiple fuel-cell circuits including the fuel-cell circuit 132.

The motor-generator 128 may convert the electrical energy stored in the battery 130 (or electrical energy received directly from the fuel-cell circuit 132) into mechanical power usable to propel the vehicle 100. The motor-generator 128 may further convert mechanical power received from the engine 126 or from wheels of the vehicle 100 into electricity, which may be stored in the battery 130 as energy and/or used by other components of the vehicle 100. In some embodiments, the motor-generator 128 may include a motor without a generator portion.

The ECU 102 may be coupled to each of the components of the vehicle 100 and may include one or more processors or controllers, which may be specifically designed for automotive systems. The functions of the ECU 102 may be implemented in a single ECU or in multiple ECUs. The ECU 102 may receive data from components of the vehicle 100, may make determinations based on the received data, and may control the operation of components based on the determinations.

The vehicle 100 may be fully autonomous or semi-autonomous. In that regard, the ECU 102 may control various aspects of the vehicle 100 (such as steering, braking, accelerating, or the like) to maneuver the vehicle 100 from a starting location to a destination.

The memory 104 may include any non-transitory memory and may be capable of storing data usable by the ECU 102. For example, the memory 104 may store instructions usable by the ECU 102 to navigate the vehicle 100 from a starting location to a destination, to avoid motor lock of the motor-generator 128, or the like. The memory 104 may store other data usable by the ECU 102 such as map data that includes road grade information at multiple locations, data indicating whether the motor-generator 128 experienced motor lock at any location, or the like.

The speed sensor 108 may include any sensor capable of detecting data that corresponds to a rotational speed of the motor-generator 128 or to a vehicle speed of the vehicle 100. For example, the speed sensor 116 may include an angular speed sensor capable of detecting radians per second, an RPM rate, or the like of the motor-generator 128, may include a speedometer, or the like.

The GPS sensor 110 may be capable of detecting location data corresponding to a location of the vehicle 100. The IMU sensor 112 may include any IMU sensor, such as an accelerometer, a gyroscope, or the like, and may detect a velocity, an orientation, an acceleration, or the like of the vehicle 100. One or both of the GPS sensor 110 or the IMU sensor 112 may be referred to as a location sensor and may be used to determine a current location, heading, and/or orientation of the vehicle 100. The GPS sensor 110 and the IMU sensor 112 may be used during autonomous driving to detect a current location and heading of the vehicle 100 for navigation purposes.

The grade sensor 114 may include any grade sensor capable of detecting a grade (i.e., a slope) of a current road that the vehicle 100 is traveling on. In some embodiments, the IMU sensor 112 may perform the functions of the grade sensor 114. In that regard, the IMU sensor 112 may also be referred to as a grade sensor.

The load sensor 116 may include any sensor capable of detecting an additional load of the vehicle 100. For example, the load sensor 116 may include a weight, mass, or force sensor capable of detecting a weight or a mass of passengers or an object being towed by the vehicle 100, a force applied to the vehicle 100 by an object being towed by the vehicle 100, force applied to the vehicle 100 due to wind resistance, force applied to the vehicle 100 due to gravitational forces, additional load caused by large tires or an uneven driving surface, or the like. In some embodiments, the load sensor 116 may be capable of detecting a load applied to at least one of the motor-generator 128 or the engine 126. In some embodiments, the load sensor may include the ECU, and the ECU may be capable of determining the load based on a torque/power request of the motor-generator 128 and/or the engine 126.

In some embodiments, the ECU 102 may be capable of determining or estimating an additional load of the vehicle 100 based on data from the load sensor 116 and/or based on one or more calculation. The additional load of the vehicle may correspond to at least one of passenger weight, tow weight, tire friction, or wind drag. In some embodiments, the ECU may be aware that a certain amount of mechanical power generated by the motor-generator 128 results in a given amount of acceleration under normal operating conditions on a given road grade. Based on the grade of the road, the current amount of power generated by the motor-generator 128, and the current acceleration, the ECU 102 may be capable of calculating any additional load of the vehicle 100 by comparing the current grade, power, and acceleration to the normal operating conditions.

The camera 118 may include one or more camera capable of detecting image data corresponding to an environment of the vehicle 100. For example, the camera 118 may be located at a front end of the vehicle 100 and may be capable of detecting image data such as lane markers, stop signs, stop lights, traffic, or the like. In some embodiments, multiple cameras may be positioned about the vehicle 100 such that image data may be detected in various directions from the vehicle 100.

The radar sensor 120 and the LIDAR sensor 122 may be capable of detecting road data corresponding to a current road condition or traffic on a current roadway. For example, the radar sensor 120 and the LIDAR sensor 122 may be capable of detecting a distance between the vehicle 100 and a surrounding object such as a stop sign, another vehicle, a wall, or the like. In some embodiments, the radar sensor 120 and the LIDAR sensor 122 may be referred to as cameras and the data they detect may be referred to as image data.

The network access device 124 may include any port or device capable of communicating via a wired or wireless interface such as Wi-Fi, Bluetooth, a cellular protocol, vehicle to vehicle communications, or the like. For example, the ECU 102 may control the network access device 124 to communicate with a cloud, an external vehicle, or one or more remote device.

In some situations, the motor-generator 128 may experience a condition called motor lock. For example, the motor-generator 128 may be a three phase motor (or a DC motor). As the vehicle 100 is moving, current flows through each phase of the motor-generator 128 (or through each of multiple coils). However, if a relatively heavy load is applied to the motor-generator 128 (i.e., if a relatively large amount of power is requested from the motor-generator 128) while the vehicle 100 is stopped, a large amount of current may continuously flow through one phase of the motor-generator 128 (or through one coil of the DC motor). This relatively large amount of current may cause the motor-generator 128 to overheat, which is referred to as motor lock.

Motor lock may occur in various situations. For example, motor lock may occur if the motor-generator 128 is being used to brake the vehicle 100 (i.e., hold the vehicle in a stopped position) while the vehicle 100 is located on an uphill road segment. As another example, motor lock may occur if the motor-generator 128 is being used to accelerate up a hill from a complete stop.

The vehicle 100 may further include a pump 134 designed to pump a coolant through the motor-generator 128. This coolant flow may reduce a temperature of the motor-generator 128, but may be insufficient to prevent all motor lock from occurring. The coolant may include a fluid, a refrigerant, a heat pump, or the like.

The vehicle 100 (or system 101) may include various features that reduce the likelihood of motor lock occurring with the motor-generator 128. In particular and referring to FIGS. 1, 2A, and 2B, a method 200 may be performed by components of the vehicle 100 or system 101 (or a similar vehicle or system) to reduce the likelihood of motor lock occurring with the motor-generator 128. An implementation of the method 200 may include any combination of blocks illustrated in FIGS. 2A and 2B, and is not limited to such blocks.

Figure 2A:
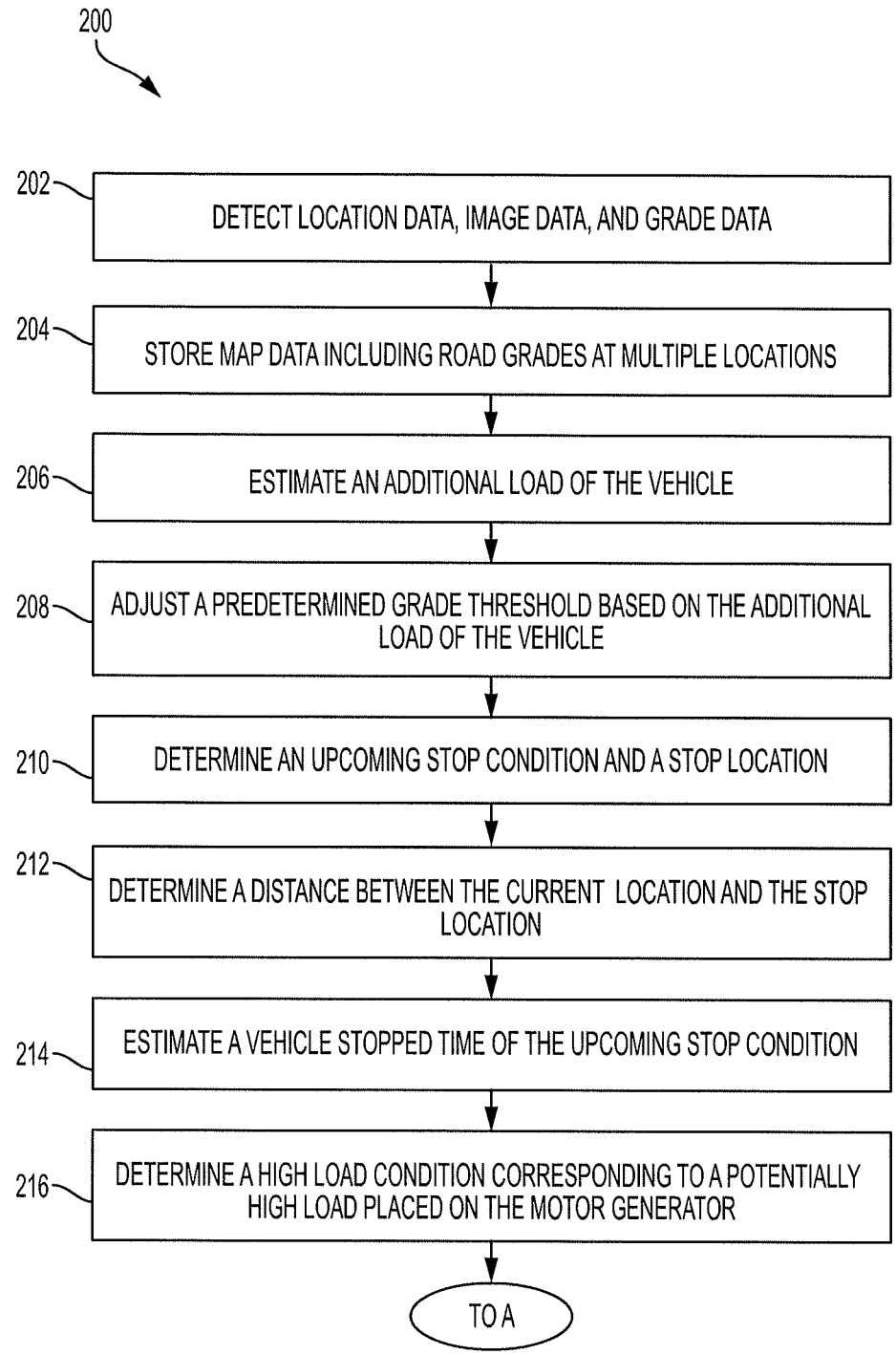
FIGS. 2A and 2B are block diagrams illustrating a method for reducing or eliminating motor lock in a motor-generator of a vehicle according to an embodiment of the present invention.
Figure 2B:
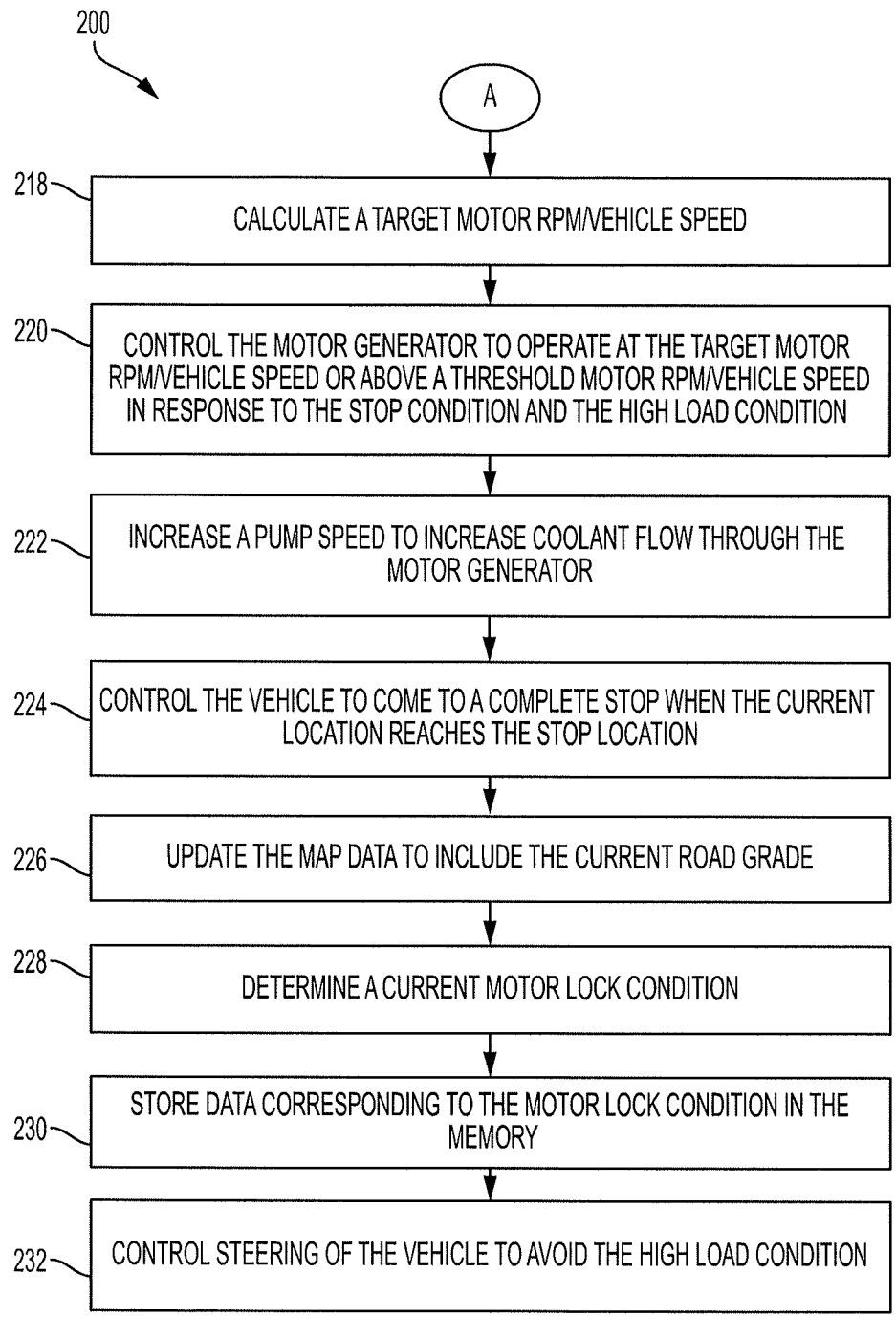

Turning to FIGS. 2A and 2B, and in block 202, the sensors of the vehicle may detect various data including location data, image data, grade data, and the like. The location data may include a current location of the vehicle and may be detected by one or more of a GPS sensor, an IMU sensor, or the like. The image data may include image data that corresponds to a current environment of the vehicle. For example, the image data may include images of roads, vehicles, stop signs, lane markers, or the like. In some embodiments, the image data may further include proximity data detected by one or both of a radar sensor or a LIDAR sensor. The grade data may correspond to a current road grade of a current road and may be detected by a grade sensor, which may include an IMU.

In block 204, map data may be stored in a memory of the vehicle. The map data may be stored in any known format and may include information such as intersections, road segments, road grades at multiple locations, or the like.

In block 206, an additional load of the vehicle may be estimated by an ECU of the vehicle. For example, the additional load of the vehicle may be estimated based on data detected by a load sensor or based on a calculation as described above. The additional load of the vehicle may correspond to at least one of passenger weight, tow weight, tire friction, wind drag, or the like.

In block 208, a predetermined grade threshold may be set or adjusted based on the additional load of the vehicle. The predetermined grade threshold may correspond to a road grade above which it is likely that a motor-generator of the vehicle will experience motor lock if the motor-generator is operating at or below a predetermined speed. For example, if the motor-generator is operating at 0 RPMs, the vehicle has a relatively high additional load, and a current road grade is 5% then it may be likely that the motor-generator will experience motor lock. As another example, if the motor-generator is operating at zero RPMs, the vehicle has a relatively low additional load, and a current road grade is 5% then it may be unlikely that the motor-generator will experience motor lock. Accordingly, the predetermined grade threshold may be 3% or 4% if the vehicle has a relatively high additional load, and maybe 5% or greater if the vehicle has a relatively low additional load.

In block 210, the ECU of the vehicle may determine an upcoming stop condition and a stop location that corresponds to the stop condition. The stop condition corresponds to a situation in which a vehicle stop is appropriate. The ECU may determine the stop condition based on the detected data. For example, if the image data includes images of one or more of a stop sign, a red stoplight, a stopped leading vehicle, or the like, then the ECU may determine the stop condition. As another example, the ECU may compare the current location of the vehicle to the stored map data and determine that a stop condition exists based on the map data. For example, the map data may include information that a stop sign exists at a predetermined location, and the ECU may determine the stop condition as the vehicle is approaching the predetermined location. As yet another example, the ECU may determine a stop condition if the radar data or the LIDAR data detects a stopped object in the path of the vehicle. As yet another example, the ECU may determine a stop condition if the network access device receives a notification from the cloud or from another vehicle indicating that traffic exists along a current route of the vehicle.

The stop location may correspond to a location at which the stop is appropriate. For example, the stop location may be determined to be a location parallel with a stop sign, a location a predetermined distance behind a leading vehicle, a location aligned with a line that marks an intersection, or the like. The ECU may determine the stop location based on detected data such as image data, location data, radar data, LIDAR data, or the like.

In block 212, the ECU may determine or calculate a distance between the current location of the vehicle and the stop location. For example, the ECU may determine this distance based on the current location of the vehicle and the stop location.

In block 214, the ECU may determine or estimate a vehicle stopped time of the upcoming stop condition. The vehicle stopped time may be an estimated amount of time before the vehicle can safely accelerate. The ECU may determine or estimate the vehicle stopped time based on detected data, received data, or the like. For example, the ECU may receive image data indicating that the vehicle is approaching a stop sign (i.e., the stop condition) and that no additional vehicles are approaching the intersection. In such a situation, the ECU may estimate the vehicle stopped time to be only a few seconds. As another example, the ECU may receive data via the network access device indicating that a certain traffic light will remain red for a set amount of time. In such a situation, the ECU may estimate the vehicle stopped time to be equal to the set amount of time in the received data. As yet another example, the ECU may receive image or other data indicating that the vehicle is approaching a red stoplight and may estimate the vehicle stopped time to be equal to an average stoplight duration, a predetermined stoplight duration, or the like. As yet another example, the ECU may receive image or other data indicating that the vehicle is approaching slow moving traffic. In such a situation, if the traffic is continuously moving, the ECU may estimate the vehicle stopped time to be zero.

In block 216, the ECU may determine a high load condition. The high load condition may be based on any detected or received data and may indicate that the motor-generator may be potentially subjected to a relatively high load. For example, the ECU may determine a high load condition in response to a road grade of a current road being greater than or equal to the predetermined grade threshold. As another example, the ECU may determine a high load condition by comparing a current location of the vehicle to map data and learning that an upcoming location along a route has a road grade that is greater than or equal to the predetermined grade threshold.

It may be likely for the motor-generator to experience motor lock if a stop condition and a high load condition are both present. In that regard, it may be desirable to cause the motor-generator to operate above a predetermined RPM rate (or to cause the vehicle to operate above a predetermined vehicle speed) at locations prior to the stop location rather than coming to a complete stop at the stop location. By causing the motor-generator to operate above the predetermined RPM rate, current will continue flowing through the various phases of the motor-generator, thus reducing the likelihood of steady current flow through one phase (which may result in motor lock).

In block 218, the ECU may calculate a target motor RPM rate or a target vehicle speed. The ECU may calculate the target motor RPM rate or the target vehicle speed based on the distance between the current location and the stop location along with the estimated vehicle stopped time. For example, if the distance between the current location and the stop location is 50 yards and the estimated vehicle stopped time is 30 seconds then the ECU may calculate a target vehicle speed of 2 mph (1 yard per second). Such a vehicle speed will allow the motor-generator to continue rotating without stopping, thus reducing the likelihood of the motor-generator experiencing motor lock.

As another example, if the distance between the current location and the stop location is 2 yards and the estimated vehicle stopped time is 30 seconds, the ECU may calculate a target vehicle speed of 0.2 mph (0.09 yards per second). Such a target vehicle speed may be sufficient to prevent or reduce the likelihood of motor lock, while still leaving extra time in case the vehicle stopped time increases.

In some embodiments, the ECU may calculate a target motor RPM rate or a target vehicle speed based on a known or predetermined motor RPM rate below which the motor-generator is likely to experience motor lock. In some embodiments, the ECU may calculate the predetermined motor RPM rate based on detected data such as a current temperature of the motor-generator, a current road grade, or the like. For example, if the motor-generator is relatively hot and the current road grade is relatively high, the ECU may calculate a predetermined motor RPM rate to be relatively high. However, if the motor-generator is relatively cool and the current road grade is relatively low, the ECU may calculate a predetermined motor RPM rate to be relatively low.

In some embodiments, the ECU may calculate a target motor RPM rate or a target vehicle speed based on a speed of traffic in front of the vehicle. For example, if traffic is flowing at 5 mph and the vehicle is traveling at 30 mph, the ECU may calculate a target motor RPM rate or a target vehicle speed that allows the vehicle to slowly approach a leading vehicle and then continue driving at 5 mph without coming to a complete stop.

In block 220, the ECU may control the motor-generator to operate at the target motor RPM rate or the target vehicle speed in response to identifying the stop condition and the high load condition. In some embodiments, the ECU may instead control the motor-generator to operate at or above a threshold motor RPM rate or a threshold vehicle speed in response to identifying the stop condition and the high load condition.

For example, if the ECU has insufficient information to calculate the target motor RPM rate or the target vehicle speed, then the ECU may instead control the motor-generator to operate at or above one of the threshold rates. In some embodiments, the ECU may fail to calculate a target motor RPM rate or a target vehicle speed and may instead control the motor-generator to operate at or above the threshold motor RPM rate or the threshold vehicle speed.

The threshold motor RPM rate may correspond to a motor RPM rate below which the motor-generator is likely to experience motor lock in a high load condition. Similarly, the threshold vehicle speed may correspond to a vehicle speed below which the motor-generator is likely to experience motor lock in a high load condition. The threshold vehicle speed may correspond to a threshold motor RPM rate and may be based on a gear ratio of a transmission between the motor-generator and wheels of the vehicle.

In some embodiments, the ECU may calculate the threshold motor RPM rate or the threshold vehicle speed based on detected data. For example, the ECU may calculate the threshold motor RPM rate or the threshold vehicle speed based on a current temperature of the motor-generator and a current road grade of a current road.

In some embodiments, the ECU may allow the vehicle to come to a complete stop a certain quantity of times, but may cause the motor-generator to remain above the threshold motor RPM rate a certain quantity of times as well. For example, if the vehicle includes 5 stop conditions that also correspond to high load conditions, the ECU may allow the vehicle to come to a complete stop at 1, 2, 3, or 4 of the stop locations, but may cause the motor-generator to remain above the threshold motor RPM rate at 1, 2, 3, or 4 of the stop locations. Such reduction in complete stops may sufficiently reduce motor lock of the motor-generator, thus increasing a lifespan of the motor-generator.

In block 222, the ECU may control a pump to increase a flow of coolant through the motor-generator in response to identifying the stop condition and the high load condition. Increasing the flow of coolant through the motor-generator may reduce a temperature of the motor-generator, thus decreasing the likelihood of the motor-generator experiencing motor lock.

In some situations, it may not be possible for the vehicle to continue moving before it reaches the stop location. In such situations, it is undesirable for the vehicle to continue moving past the stop location if the stop condition still exists. In that regard, and in block 224, the ECU may control the vehicle to come to a complete stop when the current location of the vehicle reaches the stop location.

In block 226, the ECU may update the map data to include the current road grade. The ECU may continuously update the map data to include road grade information or may only update the map data when a road grade is greater than or equal to a predetermined grade threshold. The predetermined grade threshold may correspond to a grade at or above which it is likely for the motor-generator to experience motor lock.

In block 228, if a motor lock condition is experienced, the ECU may take note that the motor lock condition has occurred. In block 230, the ECU may store data in the memory that corresponds to the motor lock condition. For example, the ECU may store information such as the grade of the road on which the motor lock occurred, the vehicle speed (or motor RPM rate) at which the motor lock occurred, the location at which the motor lock occurred, or the like.

Likewise, in block 230, the ECU may update a shared database (such as on a cloud) with data indicating that motor lock has occurred and associated data, such as the motor speed, the location, the vehicle type, the motor type, and the like. The database may be shared by multiple vehicles such that other vehicles can access the motor lock data and use the motor lock data to avoid motor lock at the location.

In some embodiments, the ECU may determine a high load condition based on the data stored in the memory (including data stored in a shared database). For example, if the vehicle is approaching a location of a previous motor lock condition, the ECU may determine a high load condition at the location. The ECU may make such a determination regardless of any data detected by sensors of the vehicle. In some embodiments, the ECU may use sensor data to confirm the determination.

Figure 3:
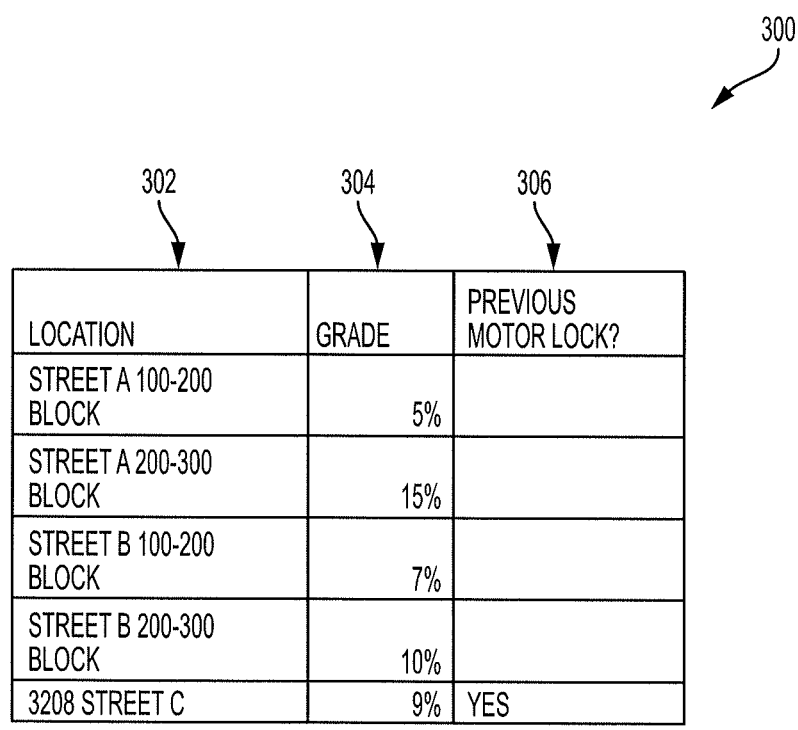
FIG. 3 is a chart illustrating exemplary map data stored in a memory of a vehicle according to an embodiment of the present invention.

Referring now to FIG. 3, a chart 300 illustrates exemplary information that may be stored in a memory, such as the memory 104 of the vehicle 100 of FIG. 1. As shown, the memory 300 may include map data including various locations 302, road grades 304 at the various locations, and whether the motor-generator has previously experienced motor lock at a given location. The locations 302 may be discrete locations or may include a general area (as shown in the chart 300).

Returning reference to FIGS. 2A and 2B, in block 232 and in some embodiments, the ECU may control steering of the vehicle to avoid high load conditions. For example, if the ECU determines two routes from a starting location to a destination and one route has a high load condition (as determined based on map data, memory data, or data retrieved from a shared database), the ECU may elect to travel along the other route. In some embodiments, the ECU may make this decision based on a balance of energy efficiency, total route time, additional load of the vehicle, likelihood of motor lock occurring, or the like.

In some embodiments, if the ECU has previously determined that motor lock occurred along one road segment (as determined based on map data, memory data, or data retrieved from a shared database), the ECU may attempt to avoid that road segment during future trips. For example, the ECU may calculate or determine an alternate route that avoids the road segment on which the motor lock occurred.

Figure 4:
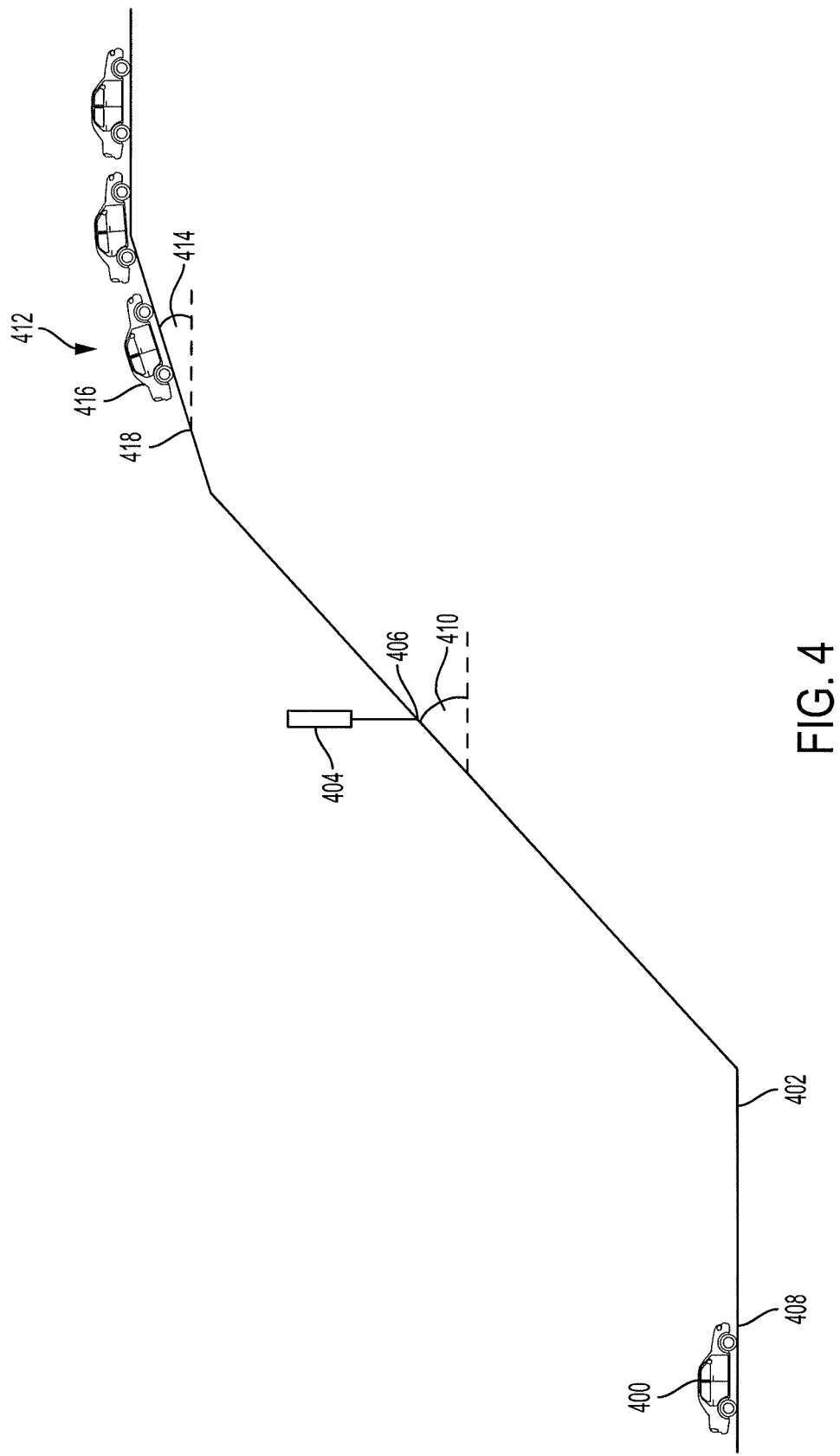
FIG. 4 illustrates an exemplary use of the method of FIGS. 2A and 2B according to an embodiment of the present invention.

Referring now to FIG. 4, an exemplary use of the method 200 of FIGS. 2A and 2B is shown. In particular, a vehicle 400, which may be similar to the vehicle 100 of FIG. 1, may perform a method similar to the method 200 of FIGS. 2A and 2B.

The vehicle 400 may include various sensors designed to detect data such as a camera, a GPS sensor, an IMU sensor, or the like. The vehicle 400 may further include a memory that stores map data.

The vehicle 400 may estimate an additional load of the vehicle. The additional load may correspond to, for example, a weight of passengers in the vehicle 400, a tow weight of an object being towed behind the vehicle 400, wind resistance that the vehicle 400 is experiencing, or the like.

Based on the estimated additional load of the vehicle, the ECU of the vehicle may adjust a predetermined grade threshold as discussed above.

The vehicle 400 may be traveling along a roadway 402. The vehicle 400 may determine that a stop sign 404 exists along a current route of the vehicle 400. For example, the vehicle 400 may include a camera that detects image data that includes the stop sign 404, a memory of the vehicle may include map data that indicates that the stop sign 404 exists at the location 406, or the like.

The ECU of the vehicle 400 may determine an upcoming stop condition and a stop location based on identifying the stop sign 404 along the route. The ECU may determine that the stop location is the location 406 which is aligned with the stop sign 404. In some embodiments, the ECU of the vehicle 400 may not determine the upcoming stop condition until the vehicle 400 is within a predetermined distance of the stop sign 404. For example, the predetermined distance may be a distance that is sufficiently large to allow the vehicle 400 to slowly approach the stop location without coming to a complete stop.

The ECU may then determine a distance between the current location 408 of the vehicle and the stop location 406 of the stop condition. The ECU may further estimate a vehicle stopped time of the upcoming stop condition. For example, no other vehicles may exist at the stop sign 404 or at a cross street and, thus, the ECU may estimate that the vehicle stopped time is relatively short.

The ECU may then determine or calculate a road grade 410 at the location of the stop sign 404. Based on the road grade 410, the ECU may determine a high load condition. For example, the ECU may determine the high load condition in response to determining that the road grade 410 is greater than the predetermined grade threshold.

The ECU may then determine or calculate a target motor RPM rate or a target vehicle speed that allows the vehicle 400 to approach the stop sign 404 without coming to a complete stop before the vehicle 400 can again accelerate. The target motor RPM rate or the target vehicle speed may be relatively low, such as 0.1 mph, to ensure safe driving of the vehicle 400 (i.e., the target speed may be sufficiently low so as to cause the vehicle to come to a near stop).

As the vehicle 400 approaches the stop location 406, the ECU may control the motor-generator to operate at the target motor RPM rate or the target vehicle speed. In some embodiments, if the ECU fails to calculate a target motor RPM rate or a target vehicle speed then the ECU may control the motor-generator to operate above a threshold motor RPM rate or a threshold vehicle speed in response to identifying the stop condition and the high load condition. For example, the threshold vehicle speed may be 0.1 mph, 0.2 mph, or the like.

As the vehicle 400 approaches the stop location 406, the ECU may control a pump to increase a pump speed of the pump to increase coolant flow through the motor-generator to further reduce the likelihood of motor lock occurring. In some embodiments, the ECU may only control the pump speed to increase if the vehicle must come to a complete stop.

As the vehicle 400 approaches the stop location 406, the ECU may determine whether it is safe for the vehicle 400 to accelerate through the stop sign 404. If it is unsafe for the vehicle 400 to accelerate through the stop sign 404 then the ECU may control the vehicle 400 to come to a complete stop at the stop location 406. Otherwise, once the ECU determines that it is safe for the vehicle 402 accelerate through the stop sign 404 then the ECU may control the motor-generator to increase the vehicle speed to accelerate through the stop sign 404.

The ECU may update map data in the memory to include the current road grade 410 at the location 406. If motor lock was experienced at the location 406 then the ECU may further update the map data to include information indicating that the motor-generator experienced the motor lock condition at the location 406.

As the vehicle 400 travels past the stop sign 404, the ECU may identify traffic 412 in front of the vehicle 400. The ECU may compare a road grade 414 at a location 418 behind the traffic 412 to the predetermined grade threshold. If the road grade 414 is less than the predetermined grade threshold than the ECU may control the vehicle 400 to come to a complete stop behind the traffic 412, if the traffic 412 is stopped. The location 418 may be a predetermined distance behind the vehicle 416, such as 5 feet, 10 feet, or the like and may be the vehicle stopped location.

If the road grade 414 is greater than the predetermined grade threshold then the ECU may calculate a target motor RPM rate or a target vehicle speed that allows the vehicle 400 to continue moving without coming to a complete stop. The ECU may then control the motor-generator to operate above the target motor RPM rate (or to cause the vehicle 400 to operate above the target vehicle speed) to reduce the likelihood of the vehicle 400 coming to a complete stop, thus reducing the likelihood of the motor-generator experiencing motor lock. However, if the vehicle 400 reaches within a predetermined distance of a leading vehicle 416 (i.e., reaches the vehicle stopped location) then the ECU may control the vehicle 400 to come to a complete stop, regardless of the high load condition, in order to prevent a collision.

Where used throughout the specification and the claims, "at least one of A or B" includes "A" only, "B" only, or "A and B." Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for mitigating motor lock of a vehicle comprising:
   a motor-generator configured to convert electrical energy into mechanical power to propel the vehicle;
   a location sensor configured to detect location data corresponding to a current location of the vehicle;
   a camera configured to detect image data corresponding to a current road condition of a current road;

a grade sensor configured to detect grade data corresponding to a current road grade of the current road; and
an electronic control unit (ECU) coupled to the motor-generator, the location sensor, the camera, and the grade sensor and configured to:
determine an upcoming stop condition corresponding to a situation in which a vehicle stop is appropriate based on at least one of the location data or the image data,
determine a high load condition corresponding to a potentially high load placed on the motor-generator based on at least one of the location data or the grade data, and
control the motor-generator to at least one of operate above a predetermined revolutions per minute (RPM) rate or cause the vehicle to move above a predetermined vehicle speed in response to determining the upcoming stop condition and the high load condition to reduce a likelihood of the motor-generator overheating.

2. The system of claim 1 wherein the ECU is further configured to determine the high load condition in response to at least one of the location data indicating that the vehicle is approaching the current road grade that is greater than a predetermined grade threshold, or the detected grade data indicating that the vehicle is located on the current road grade that is greater than the predetermined grade threshold.

3. The system of claim 2 wherein the ECU is further configured to estimate an additional load of the vehicle corresponding to at least one of passenger weight, tow weight, tire friction, or wind drag and to adjust the predetermined grade threshold based on the estimated additional load of the vehicle.

4. The system of claim 1 wherein the ECU is further configured to determine a distance between the current location of the vehicle and a stop location of the upcoming stop condition, and to calculate a target motor speed or a target vehicle speed based on the distance between the current location of the vehicle and the stop location that allows the at least one of the motor-generator to operate above the predetermined RPM rate or the vehicle to move above the predetermined vehicle speed.

5. The system of claim 4 wherein the ECU is further configured to estimate a vehicle stopped time of the upcoming stop condition corresponding to an amount of time before the vehicle can safely accelerate, and to calculate the target motor speed or the target vehicle speed further based on the vehicle stopped time.

6. The system of claim 1 further comprising a memory configured to store map data that includes road grades at multiple locations, wherein the ECU is further configured to determine the high load condition by comparing the current location of the vehicle to the map data.

7. The system of claim 6 wherein the ECU is further configured to control steering of the vehicle to cause the vehicle to travel along a secondary route that avoids the high load condition based on the map data during a subsequent vehicle trip.

8. The system of claim 6 wherein the ECU is further configured to update the map data to include the current road grade and the current location of the vehicle.

9. The system of claim 1 further comprising a memory configured to store motor lock data that indicates locations at which motor lock of the motor-generator occurred, and the ECU is further configured to determine the high load condition when the current location of the vehicle is proximate to one of the locations of the stored motor lock data.

10. The system of claim 9 wherein the memory is a shared memory accessible by multiple vehicles.

11. The system of claim 1 further comprising a pump configured to pump coolant through the motor-generator, wherein the ECU is further configured to increase a pump speed of the pump to increase flow of the coolant in response to determining the high load condition.

12. The system of claim 1 wherein the ECU is further configured to:
determine a stop location of the upcoming stop condition based at least one of a road line at an intersection, a stop sign, a stop light, or a distance between the vehicle and a leading vehicle; and
cause the vehicle to come to a complete stop in response to the current location of the vehicle reaching the stop location of the upcoming stop condition.

13. A system for mitigating motor lock of a vehicle comprising:
a motor-generator configured to convert electrical energy into mechanical power to propel the vehicle;
a location sensor configured to detect location data corresponding to a current location of the vehicle;
a camera configured to detect image data corresponding to a current road condition of a current road;
a grade sensor configured to detect grade data corresponding to a current road grade of the current road;
a memory configured to store map data; and
an electronic control unit (ECU) coupled to the motor-generator, the location sensor, the camera, the grade sensor, and the memory and configured to:
maneuver the vehicle based on the map data and at least one of the location data or the image data,
determine an upcoming stop condition corresponding to a situation in which a vehicle stop is appropriate based on at least one of the location data or the image data,
determine a high load condition corresponding to a potentially high load placed on the motor-generator based on at least one of the location data or the grade data, and
control the motor-generator to at least one of operate above a predetermined revolutions per minute (RPM) rate or cause the vehicle to move above a predetermined vehicle speed in response to determining the upcoming stop condition and the high load condition to reduce a likelihood of the motor-generator overheating.

14. The system of claim 13 wherein the ECU is further configured to determine the high load condition in response to at least one of the location data indicating that the vehicle is approaching the current road grade that is greater than a predetermined grade threshold, or the detected grade data indicating that the vehicle is located on the current road grade that is greater than the predetermined grade threshold.

15. The system of claim 13 wherein the ECU is further configured to determine a distance between the current location of the vehicle and a stop location of the upcoming stop condition, and to calculate a target motor speed or a target vehicle speed based on the distance between the current location of the vehicle and the stop location that allows the at least one of the motor-generator to operate above the predetermined RPM rate or the vehicle to move above the predetermined vehicle speed.

16. A method for mitigating motor lock of a vehicle comprising:
detecting, by a location sensor, location data corresponding to a current location of the vehicle;

detecting, by a camera, image data corresponding to a current road condition of a current road;

detecting, by a grade sensor, grade data corresponding to a current road grade of the current road;

determining, by an electronic control unit (ECU), an upcoming stop condition corresponding to a situation in which a vehicle stop is appropriate based on at least one of the location data or the image data;

determining, by the ECU, a high load condition corresponding to a potentially high load placed on a motor-generator based on at least one of the location data or the grade data; and controlling, by the ECU, the motor-generator to at least one of operate above a predetermined revolutions per minute (RPM) rate or to cause the vehicle to move above a predetermined vehicle speed in response to determining the upcoming stop condition and the high load condition to reduce a likelihood of the motor-generator overheating.

17. The method of claim 16 further comprising:

estimating, by the ECU, an additional load of the vehicle corresponding to at least one of passenger weight, tow weight, tire friction, or wind drag; and adjusting, by the ECU, a predetermined grade threshold based on the estimated additional load of the vehicle, wherein determining the high load condition includes determining the high load condition in response to at least one of the location data indicating that the vehicle is approaching the current road grade that is greater than the predetermined grade threshold, or the detected grade data indicating that the vehicle is located on the current road grade that is greater than the predetermined grade threshold.

18. The method of claim 16 further comprising storing, in a memory, map data that includes road grades at multiple locations, wherein determining the high load condition is performed by comparing the current location of the vehicle to the map data.

19. The method of claim 18 further comprising controlling, by the ECU, steering of the vehicle to cause the vehicle to travel along a secondary route that avoids the high load condition based on the map data during a subsequent vehicle trip.

20. The method of claim 16 further comprising controlling, by the ECU, a pump to increase a pump speed to increase a flow of coolant through the motor-generator in response to determining the high load condition.

* * * * *